US011591139B2

(12) United States Patent
Adams, Jr. et al.

(10) Patent No.: US 11,591,139 B2
(45) Date of Patent: Feb. 28, 2023

(54) VENTILATED LID FOR INSULATED CONTAINER

(71) Applicant: Klean Kanteen, Inc., Chico, CA (US)

(72) Inventors: Richard John Adams, Jr., Bozeman, MT (US); Joshua James Birkle, Chico, CA (US); James M. Osgood, Chico, CA (US)

(73) Assignee: KLEAN KANTEEN, INC., Chico, CA (US)

( * ) Notice: Subject to any disclaimer, the term of this patent is extended or adjusted under 35 U.S.C. 154(b) by 262 days.

(21) Appl. No.: 16/913,844

(22) Filed: Jun. 26, 2020

(65) Prior Publication Data

US 2020/0407123 A1 Dec. 31, 2020

Related U.S. Application Data

(60) Provisional application No. 62/867,045, filed on Jun. 26, 2019.

(51) Int. Cl.

| | |
|---|---|
| *B65D 41/04* | (2006.01) |
| *B65D 53/00* | (2006.01) |
| *B65D 81/38* | (2006.01) |
| *B65D 79/00* | (2006.01) |
| *A47J 41/00* | (2006.01) |

(52) U.S. Cl.
CPC ....... *B65D 41/0421* (2013.01); *A47J 41/0011* (2013.01); *B65D 53/00* (2013.01); *B65D 79/0087* (2020.05); *B65D 81/3841* (2013.01); *B65D 2251/20* (2013.01)

(58) Field of Classification Search
CPC ................ B65D 41/0421; B65D 53/00; B65D 81/3841; B65D 2251/20; B65D 79/0087; A47J 41/0011

USPC ......................................... 220/521; 215/307
See application file for complete search history.

(56) References Cited

U.S. PATENT DOCUMENTS

| | | | |
|---|---|---|---|
| 3,189,210 | A | 6/1965 | Heisler |
| 3,416,696 | A | 12/1968 | Alteneder, Jr. |
| 3,527,376 | A | 9/1970 | Young, Jr. |

(Continued)

OTHER PUBLICATIONS

ISA United States Patent and Trademark Office, International Search Report and Written Opinion Issued in Application No. PCT/US2020/039923, dated Sep. 14, 2020, WIPO, 7 pages.

*Primary Examiner* — James N Smalley
(74) *Attorney, Agent, or Firm* — Alleman Hall Creasman & Tuttle LLP

(57) ABSTRACT

A lid for an insulated container comprises a flexible gasket configured to facilitate a seal between the lid and an inner wall of the insulated container, and further configured to expand into an interior compartment of the insulated container responsive to a vacuum developing in the interior compartment. A diaphragm chamber is situated opposite the flexible gasket from the interior compartment when the lid is fully engaged with the insulated container. One or more air channels couple the diaphragm chamber to an exterior of the lid. The development of a vacuum in the interior compartment of the insulated container draws a force on the flexible gasket, thereby reducing pressure in the diaphragm chamber. The negative pressure in diaphragm chamber is back-filled with external air, which enters the lid via the air channels. The lid may then be removed without excessive vacuum forces.

18 Claims, 6 Drawing Sheets

(56) References Cited

U.S. PATENT DOCUMENTS

| | | | | |
|---|---|---|---|---|
| 3,937,358 | A | | 2/1976 | Smith et al. |
| 4,174,784 | A | * | 11/1979 | Hartung ................. B65D 53/00 |
| | | | | 215/349 |
| 4,798,302 | A | * | 1/1989 | Killestijn ........... B65D 79/0087 |
| | | | | 215/231 |
| 5,096,078 | A | * | 3/1992 | McQueeny ............ B65D 51/26 |
| | | | | 220/232 |
| 8,991,643 | B2 | * | 3/2015 | Wurster ............... B65D 41/045 |
| | | | | 220/721 |
| 10,112,742 | B1 | * | 10/2018 | Circosta ............. B65D 41/0414 |
| 2009/0179032 | A1 | * | 7/2009 | Livingston ......... B65D 79/0087 |
| | | | | 220/254.7 |
| 2012/0074143 | A1 | | 3/2012 | Lin |

* cited by examiner

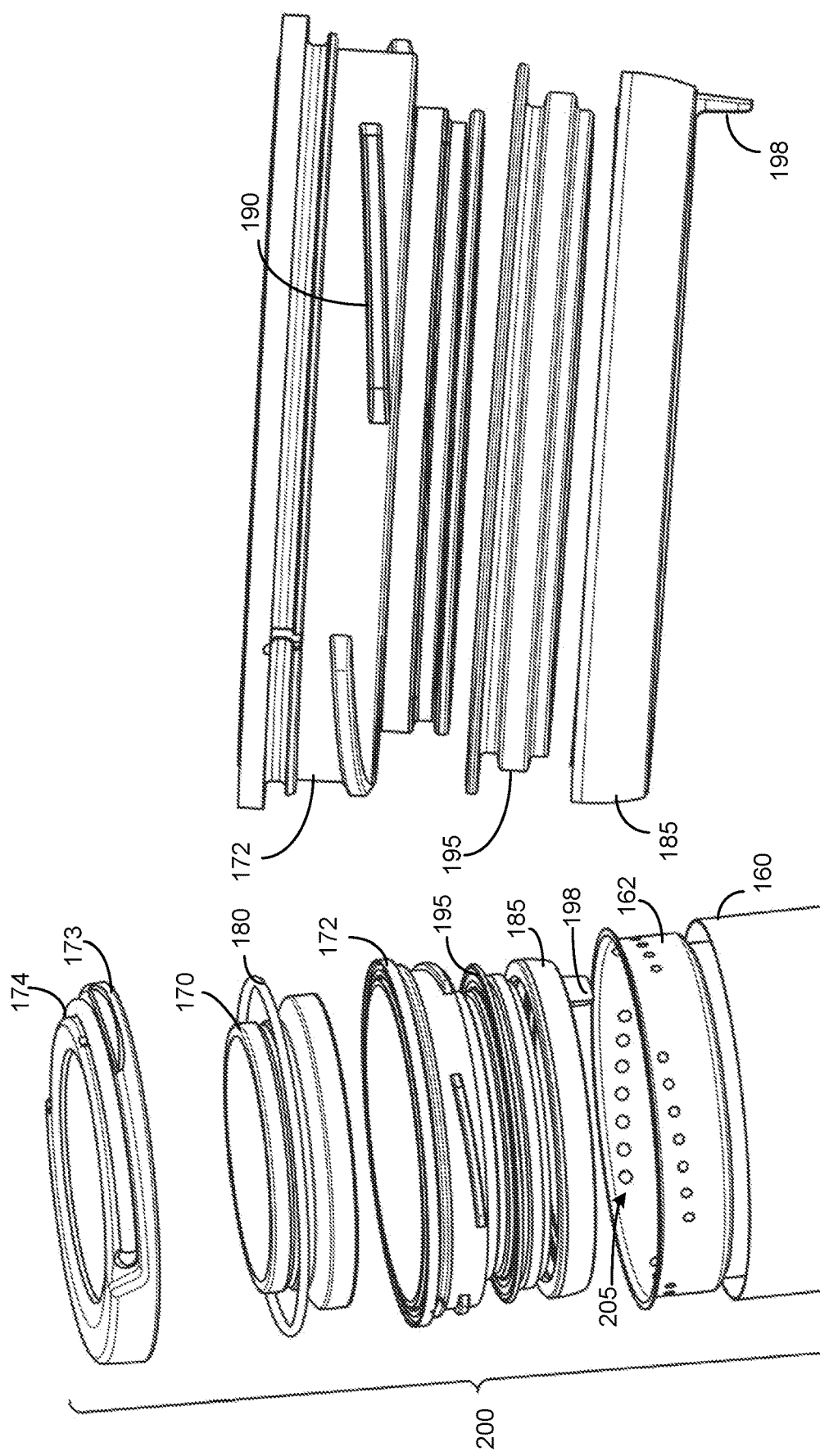

VENTILATED LID FOR INSULATED CONTAINER

CROSS REFERENCE TO RELATED APPLICATIONS

This application claims priority to U.S. Provisional Patent Application Ser. No. 62/867,045, filed Jun. 26, 2019, the entirety of which is hereby incorporated herein by reference for all purposes.

BACKGROUND

Containers can be used to store various contents, such as liquids. Some containers are designed to maintain the temperature of their contents, be they hot or cold. Vacuum flasks are commonly used as insulating storage containers. Typically, two concentric containers are joined at the neck, and the intervening gap is at least partially evacuated of air. The vacuum gap reduces heat transfer between the container contents and the environment. However, vacuum flasks are still prone to heat transfer via their lids or sealing mechanisms. During prolonged storage, heated contents are prone to cooling. Air space within the vessel also cools, generating a vacuum which may make removal of the container lid difficult.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A lid for an insulated container comprises a flexible gasket configured to facilitate a seal between the lid and an inner wall of the insulated container, and further configured to expand into an interior compartment of the insulated container responsive to a vacuum developing in the interior compartment. A diaphragm chamber is situated opposite the flexible gasket from the interior compartment when the lid is fully engaged with the insulated container. One or more air channels couple the diaphragm chamber to an exterior of the lid. The development of a vacuum in the interior compartment of the insulated container draws a force on the flexible gasket, thereby reducing pressure in the diaphragm chamber. The negative pressure in diaphragm chamber is back-filled with external air, which enters the lid via the air channels. The lid may then be removed without excessive vacuum forces.

BRIEF DESCRIPTION OF THE DRAWINGS

FIG. 3A shows an exploded view of an example insulated canister assembly.

FIG. 3B shows an exploded view of an example lid for an insulated canister assembly

All figures are drawn approximately to scale, however other relative dimensions may be used without departing from the scope of this disclosure.

DETAILED DESCRIPTION

Insulated containers, such as vacuum flasks are designed to maintain the temperature of their contents over time. However, such containers are prone to thermal compromise via the interface between the container body and a lid. The lid may act as a heat sink, allowing heated contents to cool over time, resulting in the generation of a vacuum in the otherwise sealed inner compartment of the vessel. The resulting vacuum may make removal of the container lid challenging, even causing vapor lock in the most extreme examples. While some insulated containers are ventilated, allowing outside air into the vessel is a less than ideal solution, as this may exacerbate cooling of the contents, and typically requires relatively small vents which may leak and are difficult to clean.

Additionally, wider insulated vessels, such as canisters, may generate a gasket friction problem as a result of the increased surface area condition between the lid and the vessel. Even in the absence of venting and/or cooling issues, the torque required to open a canister may be high, simply based on gasket friction. In general, people may incorrectly blame vacuum for problems with opening storage canisters when the real problem is increased friction, or a combination of vacuum and friction. Either way, the result is a sealed vessel that is difficult or impossible to open.

Figure 1A:
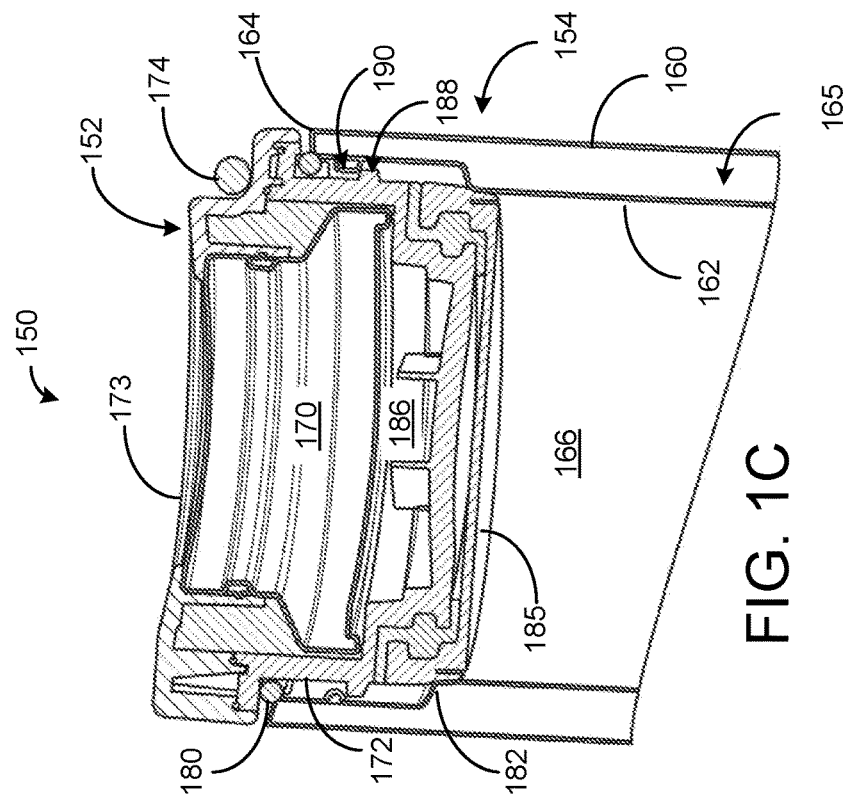
FIG. 1A shows an example insulated canister assembly.
Figure 1B:
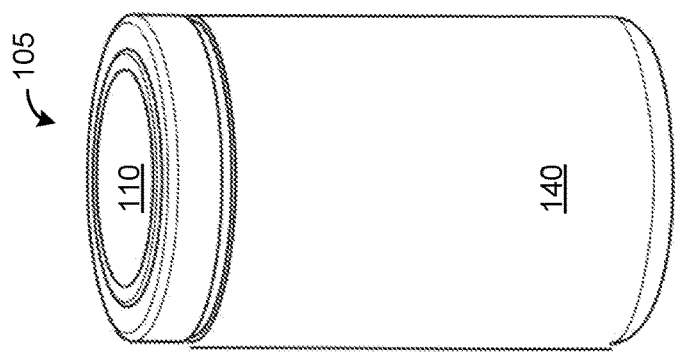
FIG. 1B shows an additional example insulated canister assembly.

For example, FIGS. 1A and 1B shows illustrations of insulated canister assemblies 100 and 105. Insulated canister assemblies 100 and 105 are configured to store liquids or other contents, and to sustain temperature differences between contents sealed within the assembly and the environment. Lid 110 is configured to reversibly couple to container body 112, via rotation of lid 110 about a central axis which may enable the insulated canister assembly 100 to be closed and opened or partially opened such that lid 110 remains partially attached to container body 112. For instance, a user may screw lid 110 in a clockwise direction to close insulated canister assembly 100 and rotate lid 110 in a counterclockwise direction to open or partially open insulated canister assembly 100. However, other opening or closing techniques may be used, in other examples.

Container body 112 may be made from stainless steel, or any other suitable material for an insulated canister assembly. Container body 112 includes a base 120 and a top 122. Top 122 includes an opening 125 which may be configured to receive lid 110. Opening 125 may provide access to central cavity 127 when lid 110 is not coupled to container body 112, allowing materials to be added to and/or withdrawn from container body 112.

Canister assembly 100 is shown with container body 112 detached from lid 110, allowing container mating complements 130 to be viewed. In this example, container mating complements 130 include sealing protrusions rather than threads. The sealing protrusions are shown arranged in a circumferential path (e.g., helical path) around an inner container surface 132. Specifically, the sealing protrusions may trace a path around the inner container surface that corresponds to a thread path 133 around lid 110. By utilizing sealing protrusions, rather than threads, a pathway from central cavity 127 to the exterior of the canister assembly may be generated when the lid 110 is partially unscrewed from container body 112. In this way, liquid contents within central cavity 127 may be poured out without having to fully remove lid 110.

The complimentary thread paths facilitate tight and robust sealing between container body 112 and lid 110 when lid 110 is attached to (e.g., screwed onto) the container body 112. In the closed configuration, as shown for canister assembly 105, container mating complements mate and seal with thread path 123, thus joining lid 110 with container body 140. In this way, liquid or other contents in container assembly 105 are sealed there within.

Container mating complements 120 are raised such that they extend inward, towards a central axis of container body 112. Specifically, in one example, the sealing protrusions may be in the shape of a dome (e.g. hemispherical, semi-hemispherical, etc.). However, a variety of protrusion shapes may be used without departing from the scope of this disclosure.

Figure 1C:
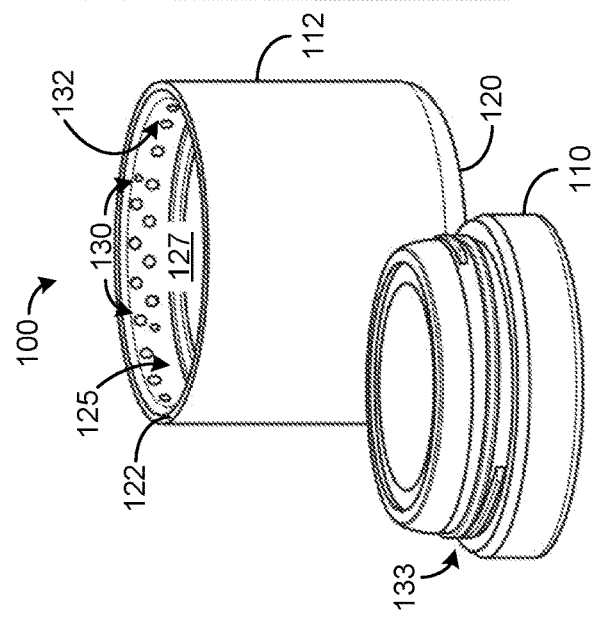
FIG. 1C shows a cross-section of an example insulated canister assembly.

FIG. 1C shows a cross section of an additional insulated canister assembly 150, comprising a lid 152 removably coupled to a container body 154. Container body 154 is shown as a double-walled container. Container body 154 includes outer wall 160 and inner wall 162. Outer wall 160 and inner wall 162 may be coupled together at top 164. A vacuum gap 165 may separate outer wall 160 and inner wall 162, insulating central cavity 166 from the external environment when lid 152 is in place.

Lid 152 includes vacuum insert 170 and mating sleeve 172. Mating sleeve 172 may function to partially encompass vacuum insert 170 and to enable lid 152 to mate with and form a seal with container body 154 (e.g., via a threading engagement). Vacuum insert 170 may be fabricated from stainless steel, from the same material as container body 154, and/or from any other suitable material.

Mating sleeve 172 may be coupled to a top 173 that includes handle 174. Handle 174 may be in the form of a bale arch that is configured to pivot away from the top of lid 152. Lid 152 may include an upper seal 180 and a lower seal 182. In this example, lower seal 182 may be considered a primary seal, while upper seal 180 may be considered a secondary seal. Upper seal 180 is depicted as an O-Ring that extends around mating sleeve 172. Lower seal 182 is included in gasket 185. Upper seal 180 may act, in addition to providing a seal, to center lid 152 on top 164. Upper seal 180 may also provide feedback to a user as to when lid 152 is fully engaged with container body 154 (e.g., by increasing rotational friction), thereby decreasing the likelihood the user will over tighten lid 152.

To address the aforementioned vacuum and friction issues, lid 152 may include gasket 185 that stretches across the base of lid 152 covering diaphragm chamber 186. Diaphragm chamber 186 is shown as being coupled to an exterior of insulated canister assembly 150 via air channels 188. As material within central cavity 166 cools, a vacuum may develop within central cavity 166. The vacuum force within central cavity 166 of container body 154 may cause gasket 185 to flex towards central cavity 166. Flexing of gasket 185 may in turn inflate diaphragm chamber 186 by drawing external air through air channels 188 and around mating threads 190.

Figure 2A:
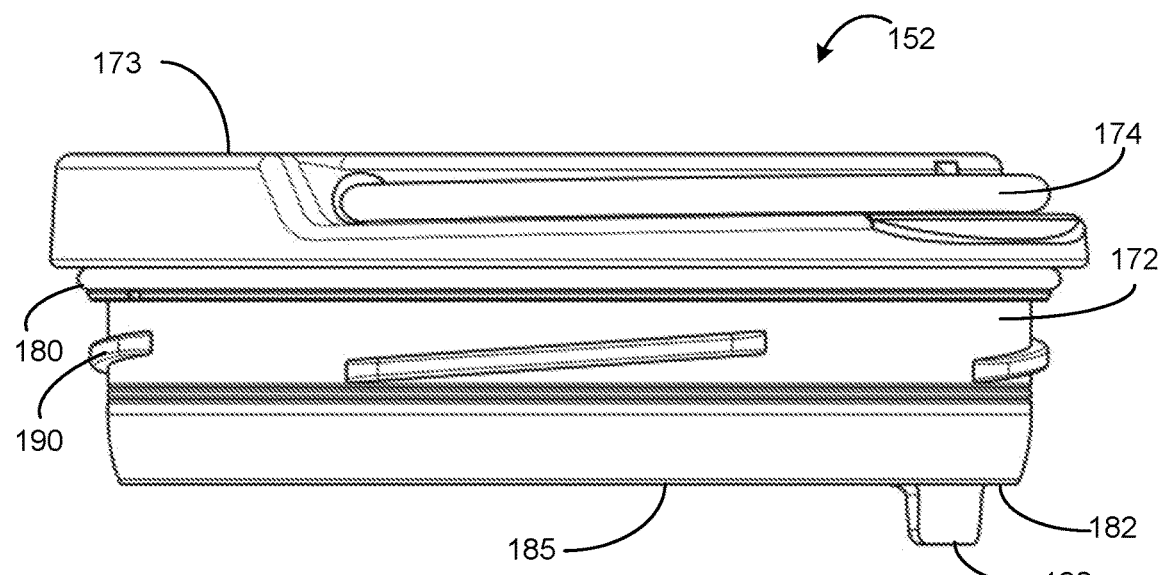
FIG. 2A shows a perspective view of an example lid for an insulated canister assembly.
Figure 2B:
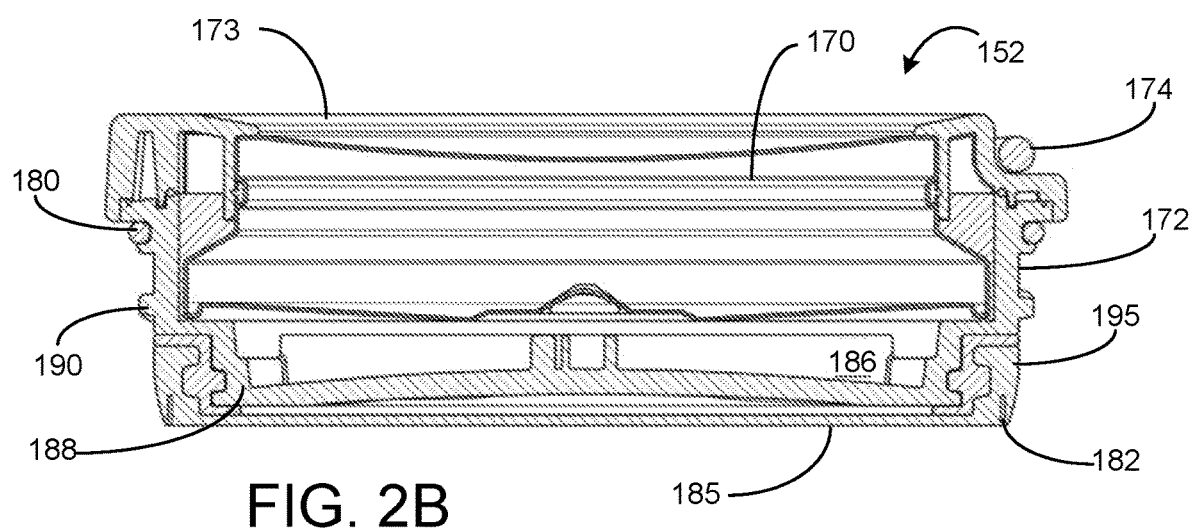
FIG. 2B shows a cross-sectional view of an example lid for an insulated canister assembly.

Diaphragm chamber 186 may thus expand to fill a portion of the space within central cavity 166, thus creating a reduced volume and maintaining the internal pressure within central cavity 166. This reduces the development of vacuum (and/or prevents a substantial increase of an existing vacuum condition), making canister assembly 150 easier to open. This approach thus accomplishes vacuum mitigation while maintaining central cavity 166 sealed from the outside, leveraging the flexing of gasket 185 to perform the ventilation function by effectively drawing air into central cavity 166 without actually exposing central cavity 166 to external air. As will be described further herein, elements of lid 152 may also reduce friction between lid 152 and container body 154 by decoupling the sealing mechanism from the rotation of the mating threads 190. Additional views of lid 152 are shown in FIG. 2A (perspective view) and FIG. 2B (cross-sectional view). Additional components such as coupling ring 195 and gasket tab 198 are indicated and discussed in more detail with regard to FIGS. 3A, 3B, and 4.

FIG. 3A shows an exploded view 200 of canister assembly 150, including outer wall 160, inner wall 162, top 173, handle 174, vacuum insert 170, upper seal 180, mating sleeve 172, gasket 185, and coupling ring 195. Coupling ring 195 may be coupled to both gasket 185 and mating sleeve 172. FIG. 3B shows an exploded view of lid 152, including mating sleeve 172, gasket 185, and coupling ring 195. Gasket 185 may be fixed in position relative to coupling ring 195. However, coupling ring 195 may be configured to rotate freely around mating sleeve 172. For example, both coupling ring 195 and mating sleeve 172 may be polycarbonate, and thus spin smoothly around each other, while coupling ring 195 and gasket 185 remain essentially stationary relative to one another.

As shown in FIGS. 3A and 3B, mating sleeve 172 includes quarter-turn mating threads 190 to couple to the mating protrusions 205 of inner wall 162. In this way, the upper portion of each thread is engaged when lid 152 is in place. The lower portion of mating threads 190 thus drives the mating sleeve off from mating protrusions 205.

Because coupling ring 195 and gasket 185 rotate freely from mating sleeve 172, gasket 185 does not rotate relative to inner wall 162 when lid 152 is being removed. Rather, mating threads 190 convert rotational force to axial force, effectively lifting gasket 185 out of container body 154 without gasket 185 swiping rotationally along inner wall 162, and thus mitigating those frictional forces. Rather, gasket 185 moves up and down as mating threads 190 engage and disengage mating protrusions 205.

Figure 4:
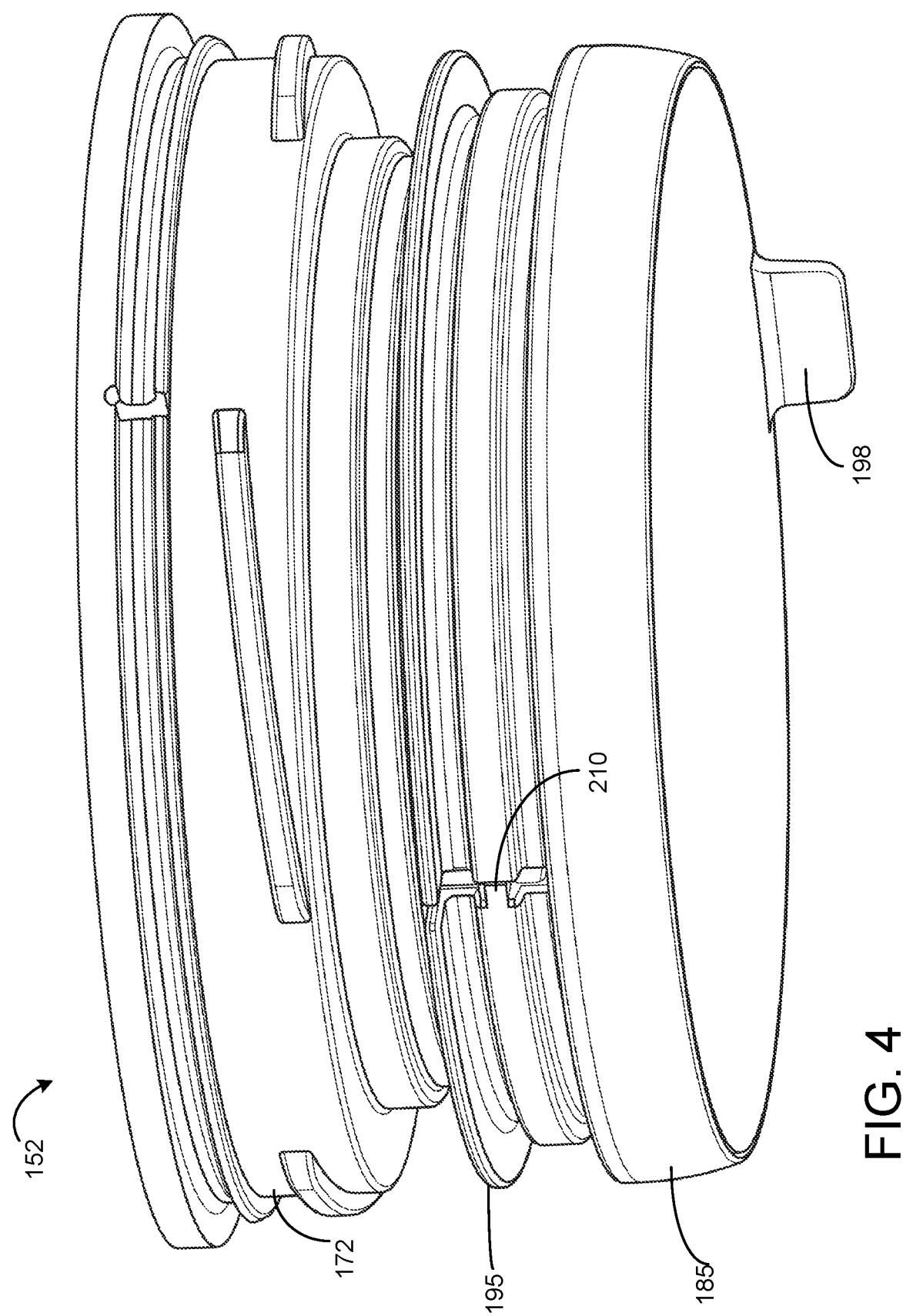
FIG. 4 shows a close-up view of a coupling ring of an example lid for an insulated canister assembly.

FIG. 4 shows a close-up view of coupling ring 195. As shown, coupling ring 195 is a split-ring, generating an air channel 210 which goes behind gasket 185. The elastic nature of gasket 185 maintains coupling ring 195 in place. Coupling ring 195 may be flexible enough to allow a user to remove and replace the coupling ring for cleaning purposes, etc. As gasket 185 and coupling ring 195 rotate freely around mating sleeve 172, they may be challenging to remove for cleaning. As such, a gasket tab 198 may be included to increase the ease of removing these components.

Figure 5A:
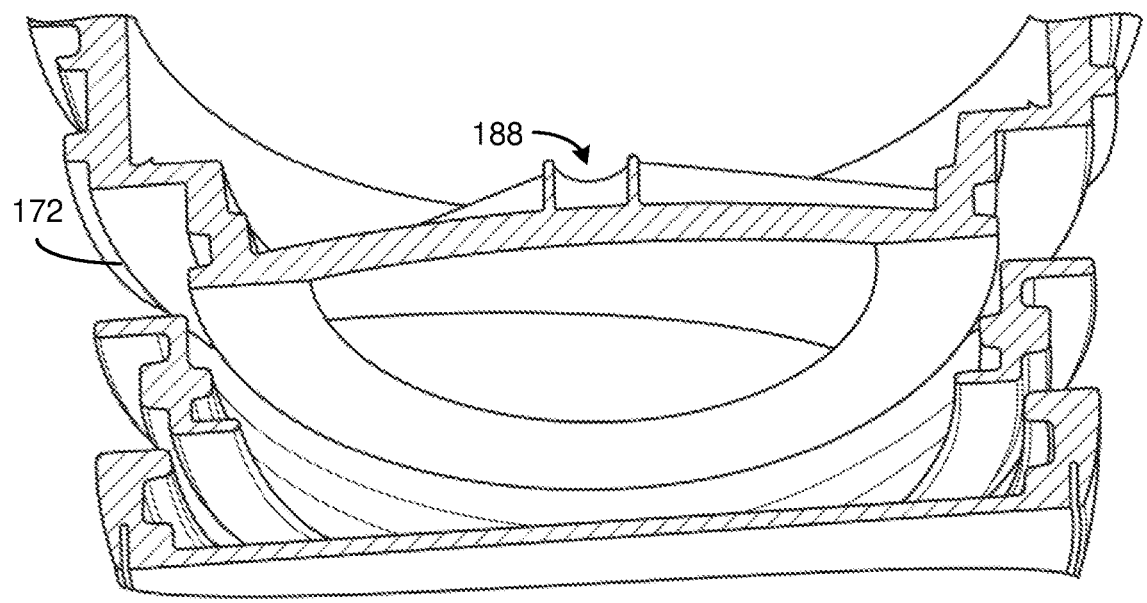
FIG. 5A shows a cross-sectional view of a base of an example mating sleeve.
Figure 5B:
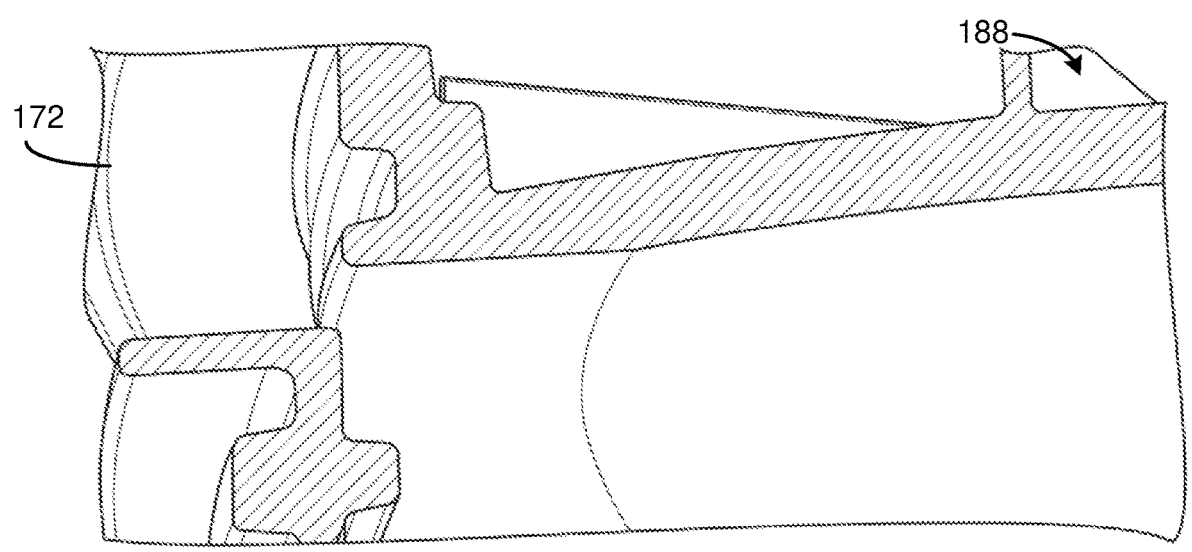
FIG. 5B shows a close-up view of the cross-sectional view of FIG. 5A.

The split-ring allows air to enter the air channels 188 on the cap-side of diaphragm chamber 186. These channels are thus exposed and active even when the cap is fully screwed on, while allowing gasket 185 to maintain a quality seal with inner wall 162. FIGS. 5A and 5B show a cross section of mating sleeve 172, indicating air channels 188. Air channels 188 traverse the base of the molded portion of mating sleeve 172. However, other air channel pathways through lid 152 have been considered.

Figure 6A:
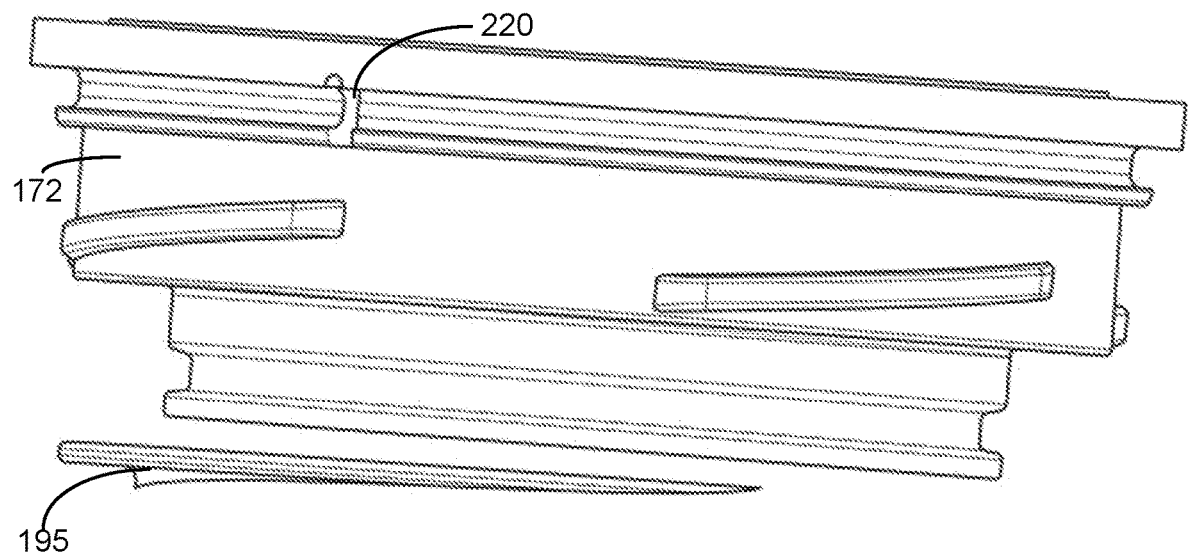
FIG. 6A shows a close-up view of a mating sleeve of an example lid for an insulated canister assembly.
Figure 6B:
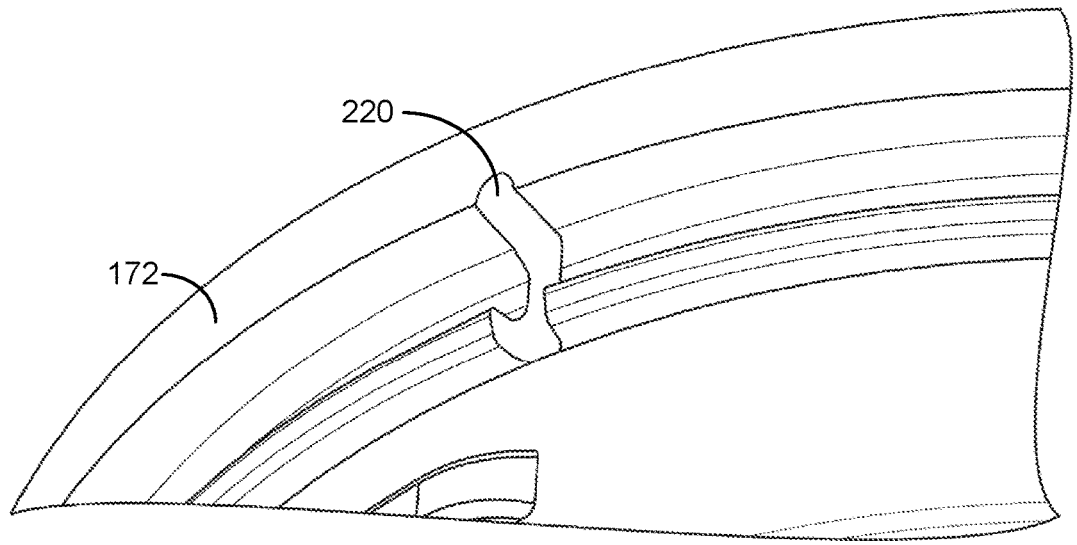
FIG. 6B shows a close-up view of an air channel of the mating sleeve of FIG. 6A.

To facilitate air entry into air channels 188, mating sleeve 172 may further include O-ring channels 220 which allow outside air to traverse upper seal 180. Examples are shown in FIGS. 6A and 6B. Thus, the development of a vacuum in central cavity 166 draws a force on gasket 185, reducing pressure in diaphragm chamber 186. The negative pressure in diaphragm chamber 186 is thus back-filled with external air, which enters canister assembly 150 via o-ring channels 220, traverses gaps between mating protrusions 205, and enters air channels 188 via the air channel 210 created by the split in coupling ring 195. Lid 152 may then be removed without excessive vacuum or frictional forces.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A lid for an insulated container, comprising:
a flexible gasket configured to facilitate a seal between the lid and an inner wall of the insulated container, and further configured to expand into an interior compartment of the insulated container responsive to a vacuum developing in the interior compartment;
a diaphragm chamber situated opposite the flexible gasket from the interior compartment when the lid is fully engaged with the insulated container, the diaphragm chamber located on an interior of a mating sleeve configured to couple the lid to the insulated container; and
one or more air channels coupling the diaphragm chamber to an exterior of the lid.

2. The lid of claim 1, wherein the mating sleeve is coupled to the flexible gasket via a coupling ring.

3. The lid of claim 2, wherein the coupling ring is configured as a split ring, and where the air channels are coupled to the exterior of the lid via a split in the coupling ring.

4. The lid of claim 2, wherein the coupling ring is fixed in rotational position relative to the flexible gasket.

5. The lid of claim 4, wherein the coupling ring and the flexible gasket rotate freely relative to the mating sleeve.

6. The lid of claim 1, wherein the mating sleeve includes two or more non-contiguous mating threads.

7. The lid of claim 1, wherein the mating sleeve is configured to receive an O-ring that forms an upper seal when the lid is mated to the insulated container.

8. The lid of claim 7, wherein the mating sleeve includes one or more O-ring channels that facilitate air flow from the exterior of the lid past the O-ring.

9. An insulated container assembly, comprising:
a container body, including an inner wall and an outer wall coupled at a top of the container body and separated by a vacuum gap; and
a lid that is reversibly attachable to the container body, the lid including:
a flexible gasket configured to facilitate a seal between the lid and an inner wall of the insulated container, and further configured to expand into an interior compartment of the insulated container responsive to a vacuum developing in the interior compartment;
a diaphragm chamber situated opposite the flexible gasket from the interior compartment when the lid is fully engaged with the insulated container, the diaphragm chamber located on an interior of a mating sleeve configured to couple the lid to the insulated container; and
one or more air channels coupling the diaphragm chamber to an exterior of the lid.

10. The insulated container assembly of claim 9, wherein the mating sleeve is coupled to the flexible gasket via a coupling ring.

11. The insulated container assembly of claim 10, wherein the coupling ring is configured as a split ring, and where the air channels are coupled to the exterior of the lid via a split in the coupling ring.

12. The insulated container assembly of claim 10, wherein the coupling ring is fixed in rotational position relative to the flexible gasket.

13. The insulated container assembly of claim 12, wherein the coupling ring and the flexible gasket rotate freely relative to the mating sleeve.

14. The insulated container assembly of claim 9, wherein the mating sleeve includes two or more non-contiguous mating threads.

15. The insulated container assembly of claim 9, wherein the mating sleeve is configured to receive an O-ring that forms an upper seal when the lid is mated to the insulated container.

16. The insulated container assembly of claim 15, wherein the mating sleeve includes one or more O-ring channels that facilitate air flow from the exterior of the lid past the O-ring.

17. An insulated container assembly, comprising:
a container body, including an inner wall and an outer wall coupled at a top of the container body and separated by a vacuum gap, the inner wall including a plurality of mating protrusions; and
a lid that is reversibly attachable to the container body, the lid including:
a flexible gasket configured to facilitate a seal between the lid and an inner wall of the insulated container; and
a mating sleeve coupled to the flexible gasket via a coupling ring, such that the flexible gasket is fixed in position relative to coupling ring, such that the coupling ring rotates freely around the mating sleeve, and such that the flexible gasket does not rotate relative to the inner wall when the lid is being removed from the container body.

18. The insulated container assembly of claim 17, wherein the flexible gasket is further configured to expand into an interior compartment of the insulated container responsive to a vacuum developing in the interior compartment.

* * * * *